United States Patent [19]
Yang

[11] Patent Number: 5,368,133
[45] Date of Patent: Nov. 29, 1994

[54] BRAKE SYSTEM FOR ROLLER CASTERS

[76] Inventor: Sung-Wang Yang, No. 258-15, An-Ting, An Chia Tsun, An Ting Hsiang, Tainan Hsien, Taiwan, Prov. of China

[21] Appl. No.: 121,873

[22] Filed: Sep. 17, 1993

[51] Int. Cl.⁵ .................. B60B 33/00; B62C 7/02
[52] U.S. Cl. .................. 188/1.12; 188/69; 16/35 R; 74/483 PB
[58] Field of Search .......... 188/1.12, 69, 265, 264 W; 16/35 R; 301/108.3, 108.1; 74/483 PB

[56] References Cited

U.S. PATENT DOCUMENTS

| | | | |
|---|---|---|---|
| 3,734,579 | 5/1973 | Schumacher | 301/108.3 X |
| 4,479,566 | 10/1984 | Ishii | 188/1.12 |
| 5,215,356 | 6/1993 | Lin | 301/108.1 X |

FOREIGN PATENT DOCUMENTS 422376  4/1991  European Pat. Off. ............ 16/35 R Primary Examiner—Robert J. Oberleitner
Assistant Examiner—Kevin D. Rutherford
Attorney, Agent, or Firm—Morton J. Rosenberg; David I. Klein

[57] ABSTRACT

A brake system for roller casters includes a pair of wheels rotatably mounted to respective sides of a main unit by means of a shaft, a brake assembly mounted within the main unit. The brake assembly includes a brake lever which will extend into a gear tooth of each wheel and jams the free movement of the wheel.

2 Claims, 9 Drawing Sheets

1—1

BRAKE SYSTEM FOR ROLLER CASTERS

FIELD OF THE INVENTION

This invention is directed to roller casters, and more particularly, a brake system adapted to stop the roller casters from rolling freely on an external surface.

BACKGROUND OF THE PRIOR ART

Roller casters are widely used with a variety of furniture pieces and other loads for the convenience in moving, especially when the imparted load is large. However, in some prior art systems it was found that the rollers tend to roll randomly which may cause goods to be dropped. One prior art brake system to top the roller from rolling freely is shown in FIG. 9. The roller caster is generally composed of a main body A having a shank A1 extending upwardly therefrom. A roller B having a hole B1 along its axis is adapted to receive a shaft D therein and is secured by a pair of shaft covers C at respective ends thereof. Each shaft cover C has a protuberance C1 adapted to slide into a rail A2 formed in the inner wall of the main body A to confine movement of the cover C while the roller B is rolling. A brake block E extending from the top of the main body A engages the surface of the roller B to produce a friction force on the roller B when the brake block E is pressed downwardly. However, there are problems associated with this type of prior art system resulting from block E being accidentally released. Additionally, the brake block E may be broken if the roller caster is forced to move when it is in a locked position.

SUMMARY OF THE INVENTION

It is the primary object of the present invention to provide a brake system for roller casters which stops the roller casters from moving freely.

It is another object of the present invention to provide a brake system for roller casters which will not disengage accidentally.

It is a further object of the present invention to provide a brake system for roller casters which is operationally simple.

DETAILED DESCRIPTION OF THE PREFERRED EMBODIMENT

Figure 1:
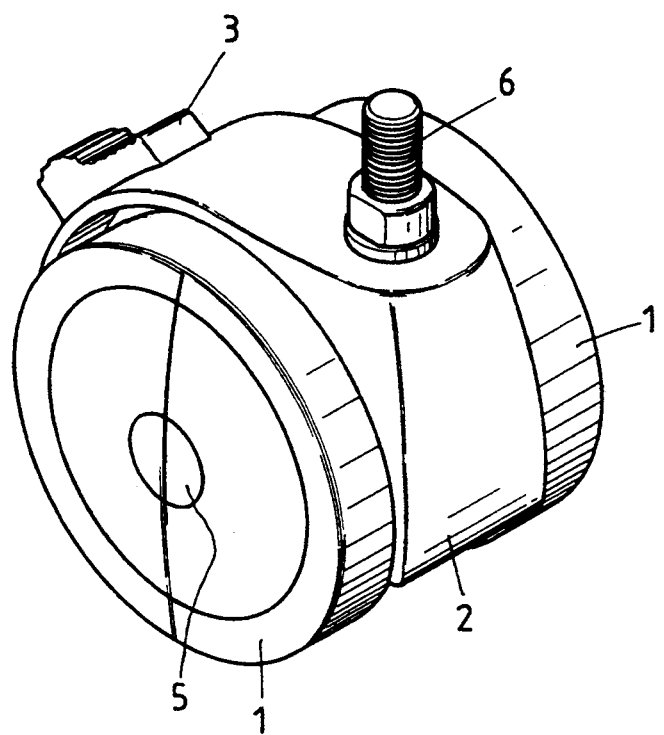
FIG. 1 is a perspective view of the subject brake system.
Figure 2:
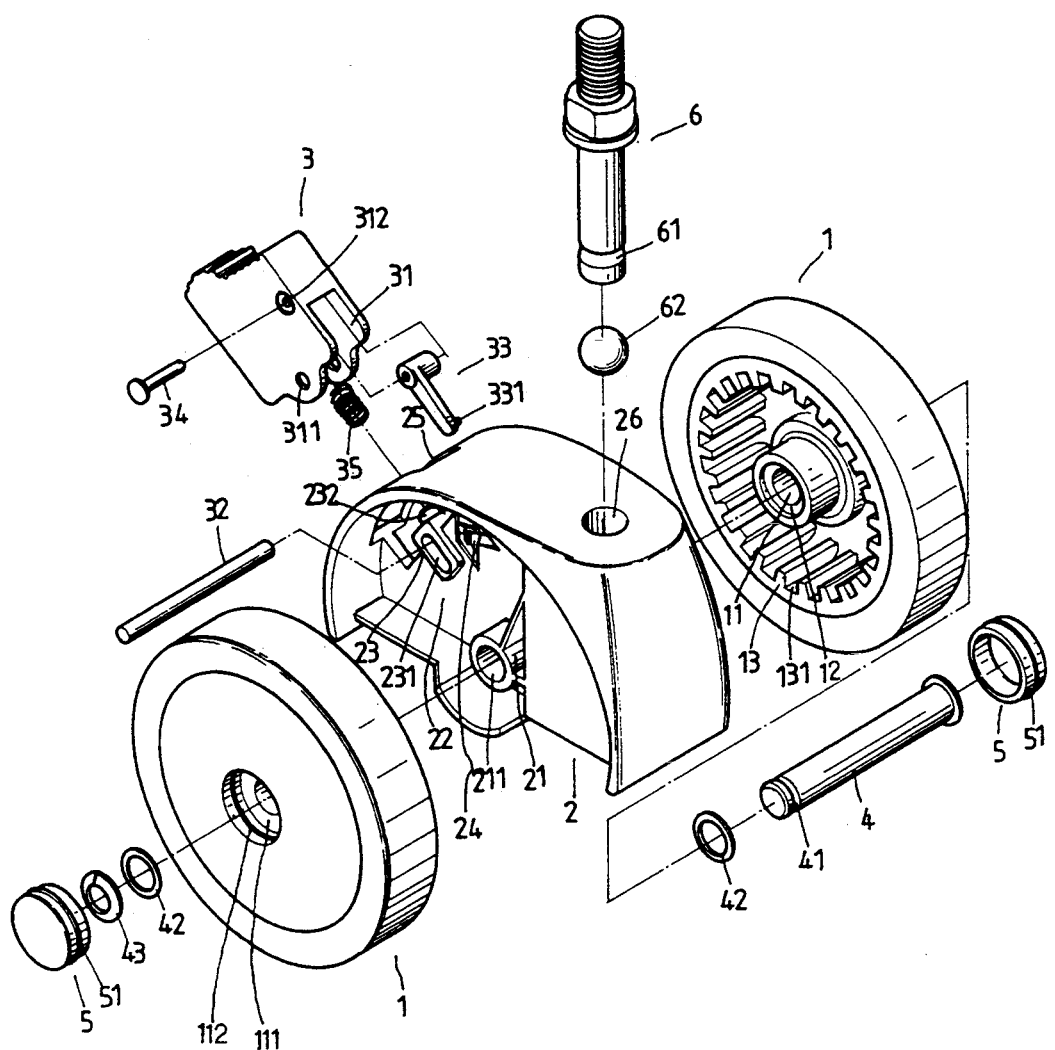
FIG. 2 is an exploded perspective view of the brake system of this invention.

Referring now to the drawings of the present invention, in particular to FIGS. 1 and 2, which includes essentially a pair of identical wheels 1 rotatably mounted to respective sides of a main body 2 by means of a shaft 4. A brake assembly 3 is detachably mounted to the main body 2, and a shank 6 extends upwardly therefrom.

Each wheel 1 has a shaft hole 11 passing through a respective center adapted to have the shaft 4 inserted therethrough. A plurality of projecting gear teeth 13 are spaced apart from each other along the inner surface of the wheel 1. The hole 11 is formed with inner and outer recesses 12, 111 and 112. The inner recess 12 is adapted to receive a tubing member 21 having an aperture 211 along its axis adapted for the shaft 4 to slide therein. The recess 111 accommodates insert of washer 42 and lock washer 43. Recess 112 receives wheel cap 5.

Figure 3:
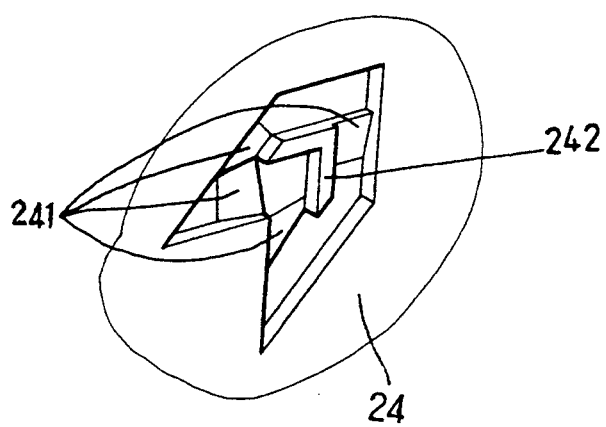
FIG. 3 is an enlarged view of an arrow groove of the subject invention concept shown in FIG. 2.

The main body 2 includes an extending wall 22 formed at one side of the body 2 along the tubing member 21. An engaging block 23 having a longitudinal trough 231 is mounted within body 2. The body 2 further includes arrow trough 24, a groove 25 formed on one side thereof, and a bore 26 as shown in FIG. 2. The arrow trough 24 includes a plurality of inclined surfaces 241 at an inner end, and a small arrow block 242 positioned at the center thereof as shown in FIGS. 2 and 3.

The brake assembly 3 is formed principally of a piece of hardened material contoured into a box shape. Brake assembly 3 includes a pair of walls 31 at respective sides having a pair of holes 311 and a pair of rivet holes 312 formed therein. A spring 35 and brake lever 32 are provided in cooperation with a driving lever 33 having a protuberance 331 at one end thereof.

Figure 4:
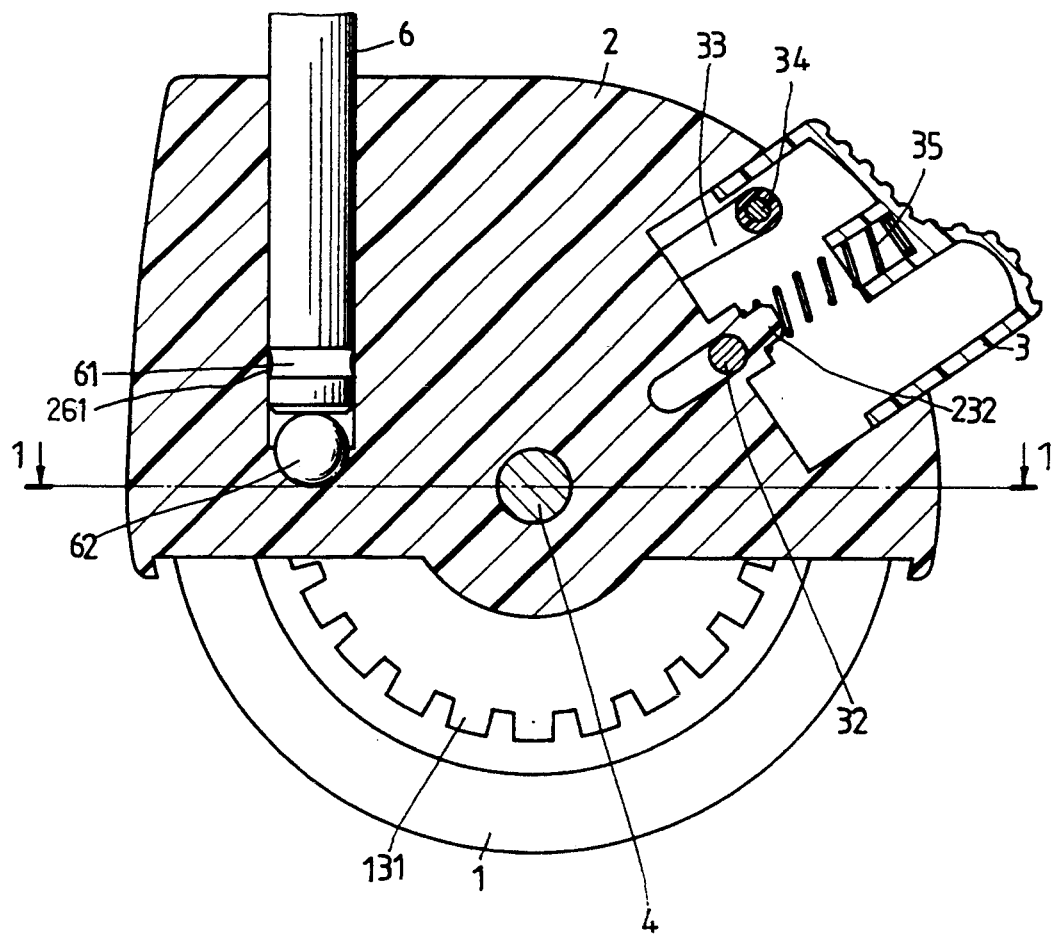
FIG. 4 is an elevational cross-sectional view of the brake system.
Figure 5:
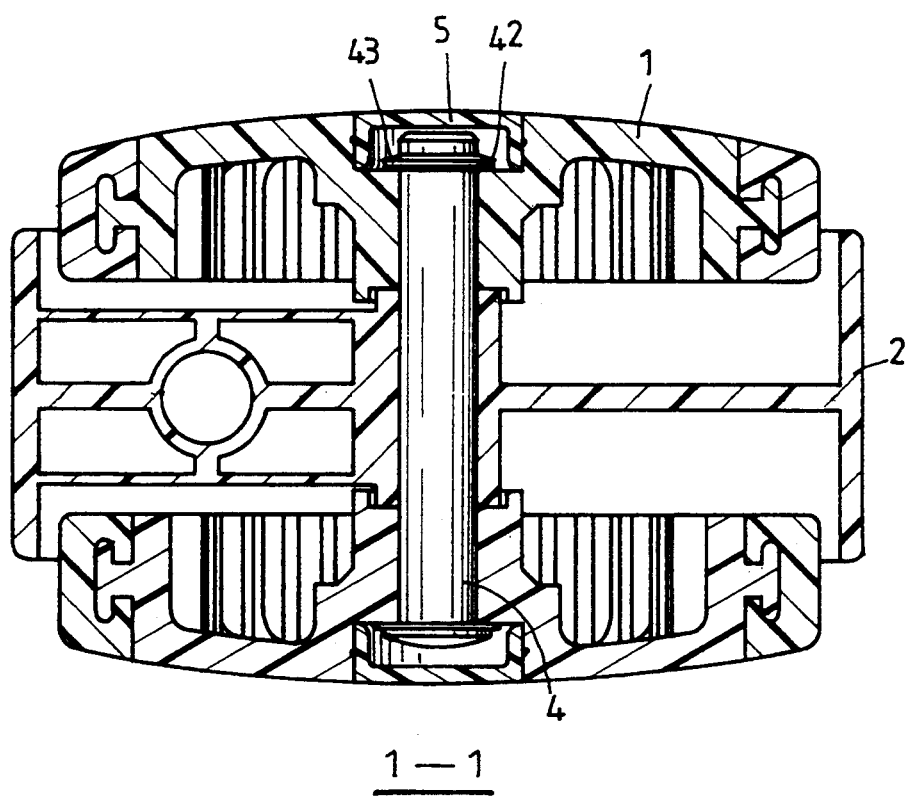
FIG. 5 is a plan sectional view, taken along line 1—1 of FIG. 4.
Figure 6:
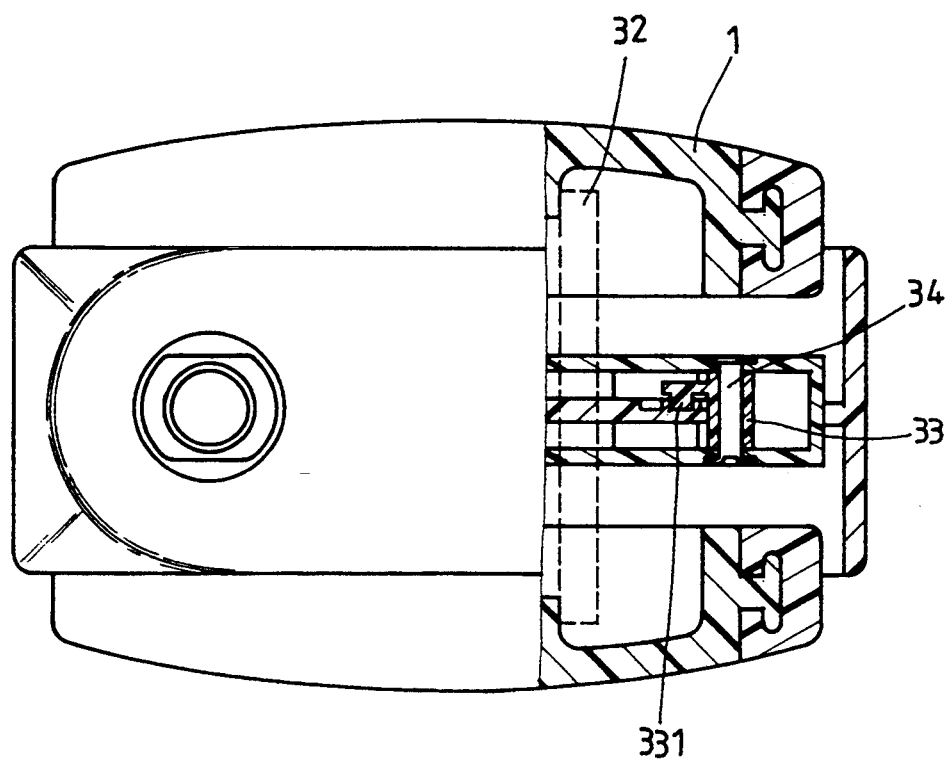
FIG. 6 is a partially sectional plan view of the subject brake system.
Figure 7:
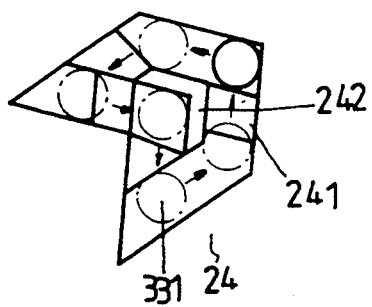
FIG. 7 is an enlarged view of the arrow groove shown in FIG. 3.
Figure 8:
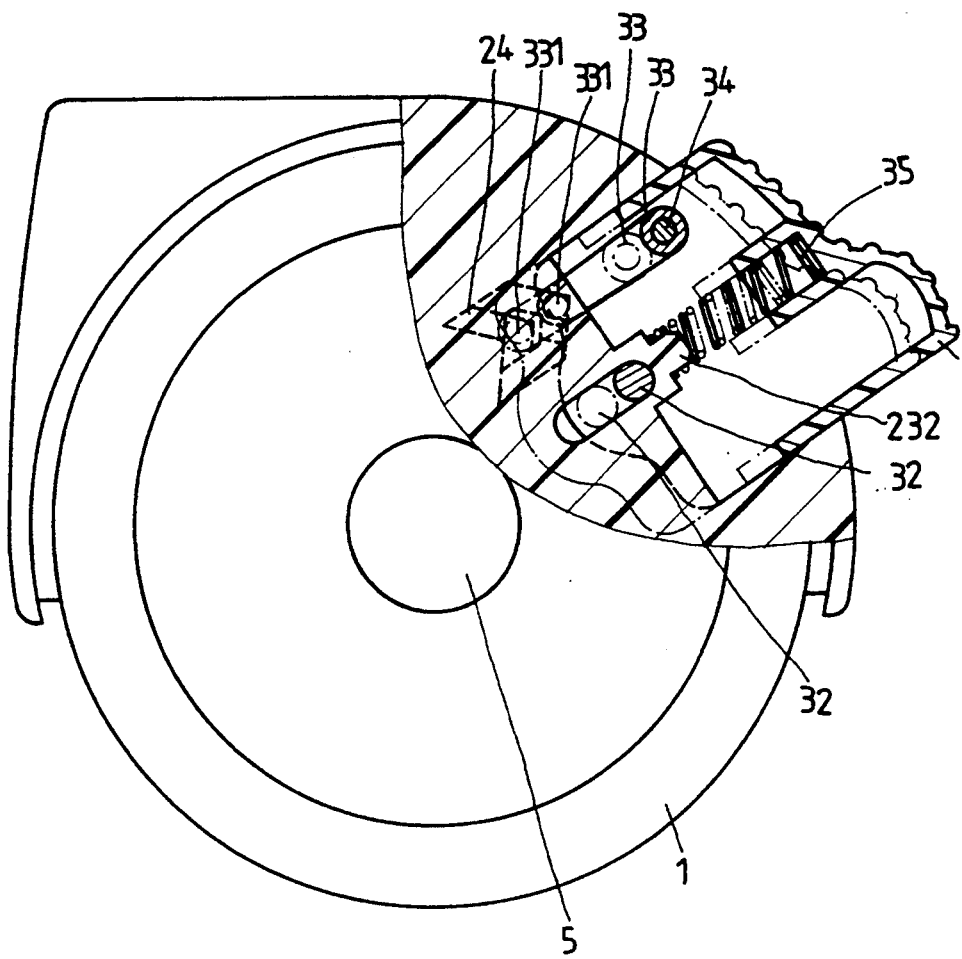
FIG. 8 is an elevational partially sectional view of the subject brake system.
Figure 9:
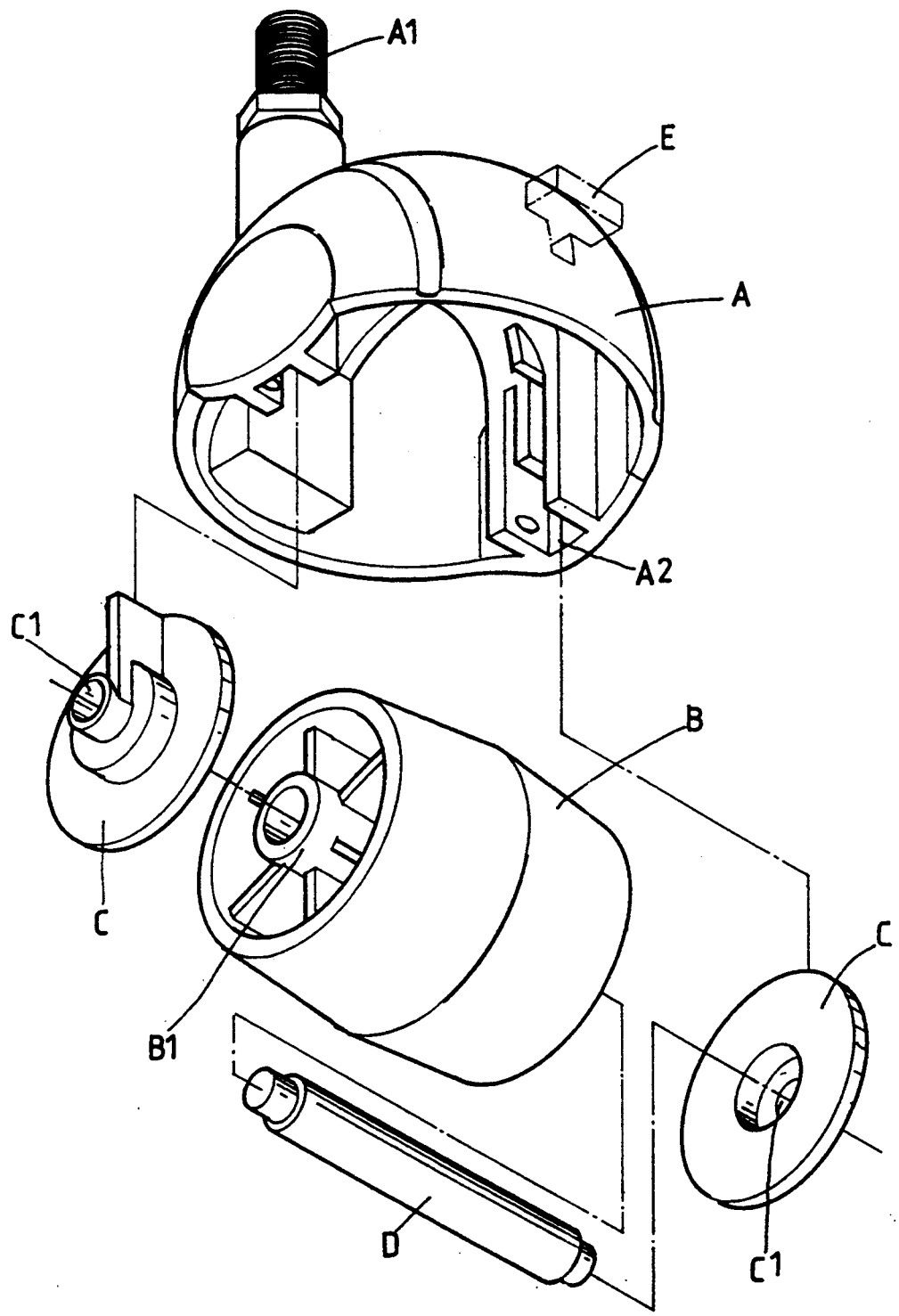
FIG. 9 is a prior art roller brake system.

The driving lever 33 is inserted into the main body 2 with the protuberance 331 engaging the arrow trough 24. The brake assembly 3 is inserted into the main body 2 through the groove 25 and one end of the spring 35 is connected to the protuberance 331 of the driving lever 33. Rivet 34 is passed through the rivet hole 312 formed through one wall 31 and passes through the driving lever 33 and is fastened at the other side of the rivet hole 312. The brake lever 32 is inserted through the hole 311 on one wall 31 and extends through the longitudinal trough 231 and is fastened at the other wall within hole 311. The two wheels 1 are positioned on tubing member 21 at respective sides of the main body 2, and the shaft 4 slides through the hole 11 of the wheel 1. The shaft 4 passes through aperture 211 of the tubing member 21 and extends out from the hole 11 of the other wheel 1. The shaft 4 is fastened by means of a lock washer 43 inserted into a circular groove 41 of the shaft 4. The wheel caps 5 are inserted in the respective recesses 112 with the flanges 51 inserted into the recess 111. A ball 62 and the shank 6 pass into the bore 26, and assembly is completed, as shown in FIGS. 4, 5 and 6.

In operation, the wheels 1 are freely movable in any direction when the protuberance 331 of the driving lever 33 is located in the small arrow block 242 of the arrow trough 24. This pulls the spring 35 and the brake assembly 3 downwardly with the brake lever 32 remaining in the innermost position in the longitudinal trough 231 and disengaging from the gears 13 of the wheels 1. If the brake assembly 3 is pushed, the protuberance 331 of the driving lever 33 will slide along the inclined surfaces 241 of the arrow trough 24 and stays at the top position of the arrow trough 24. This movement also will release the spring 35 and the brake assembly 3 to its upright position. The brake lever 32, at this moment, is also brought into the outermost position of the longitudinal trough 231 and extends into space 131 between the teeth of the respective wheels 1 to constrain the wheels 1.

I claim:

1. A brake system for roller casters comprising:
   (a) a main body housing having a central aperture formed therethrough;
   (b) a pair of transversely displaced wheel members mounted on opposing sides of said main body housing, said wheel members having respective wheel apertures in aligned relation with said main body central aperture for passage therethrough of a wheel shaft being coupled to said wheel members, each of said wheel members having gear teeth formed on an inner surface thereof;
   (c) a shank member extending through a top surface of said main body housing and rotatably coupled thereto; and,
   (d) an engaging block mounted to an inner wall of said main body housing having an extended slot passing therethrough;
   (e) an arrow trough member having a first arrow shaped block and a second arrow shaped block, said first and second arrow shaped blocks being located in cooperative relation each to the other by a continuous set of inclined surfaces formed on said arrow trough member; and,
   (f) a brake assembly displaceably inserted through a through groove formed in a wall of said main body housing, said brake assembly including a driving lever having a protuberance formed on one end thereof for sliding engagement on said inclined surfaces for reversible displacement from said first arrow shaped block to said second arrow shaped block, said brake assembly further including a spring member connected to said protuberance and a brake lever extending through said extended slot of said engaging block for displacement of said brake lever into engagement with said gear teeth of said wheel members when said protuberance is displaced into said first arrow shaped block and out of engagement with said gear teeth when said protuberance is displaced into said second arrow shaped block.

2. The brake system for roller casters as recited in claim 1 including a pair of wheel caps having flanges formed thereon for insert into respective recesses formed in said wheel members surrounding said wheel apertures for mounting said wheel shaft therein.

* * * * *